E. FILLETTAZ.
STARTING DEVICE FOR MOTOR VEHICLE ENGINES.
APPLICATION FILED DEC. 28, 1914.
1,178,788.
Patented Apr. 11, 1916.
4 SHEETS—SHEET 1.
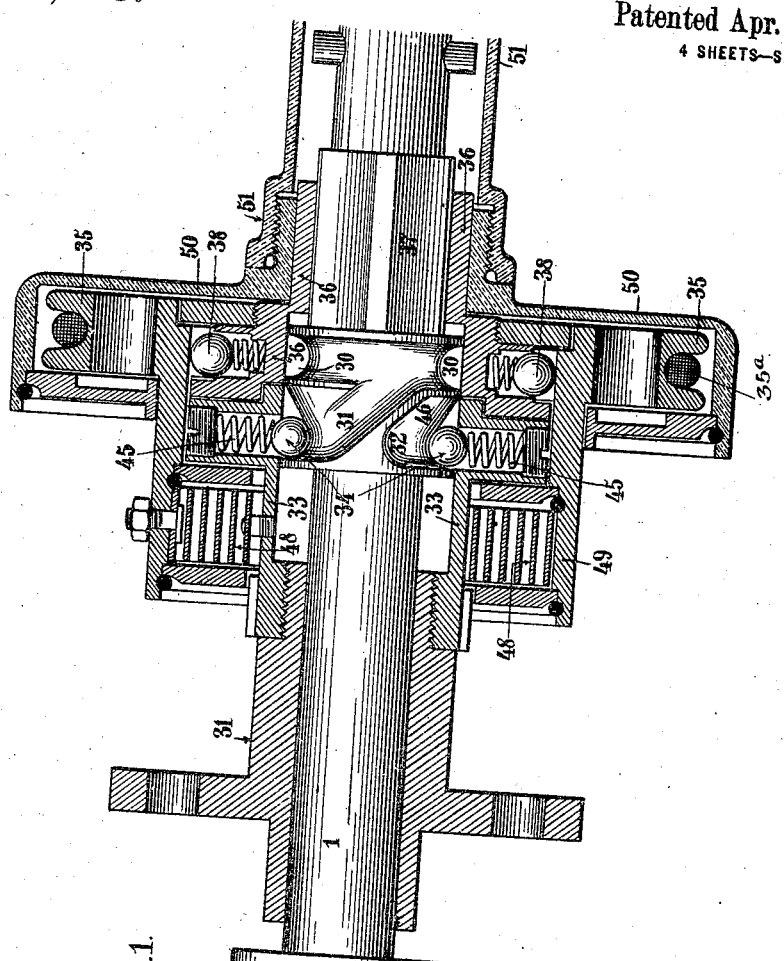
Fig.1.
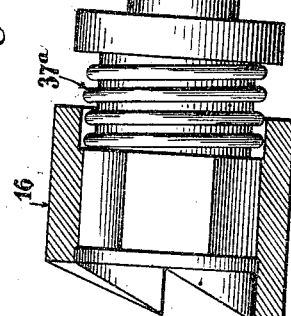
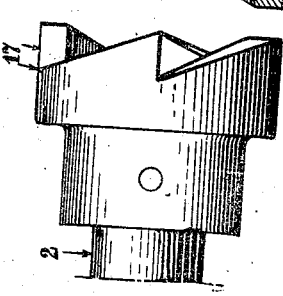
WITNESSES.
E. G. McGee
I. M. Hartig
INVENTOR
Edmond Fillettaz
BY
Emil Reimelyche
ATTORNEY

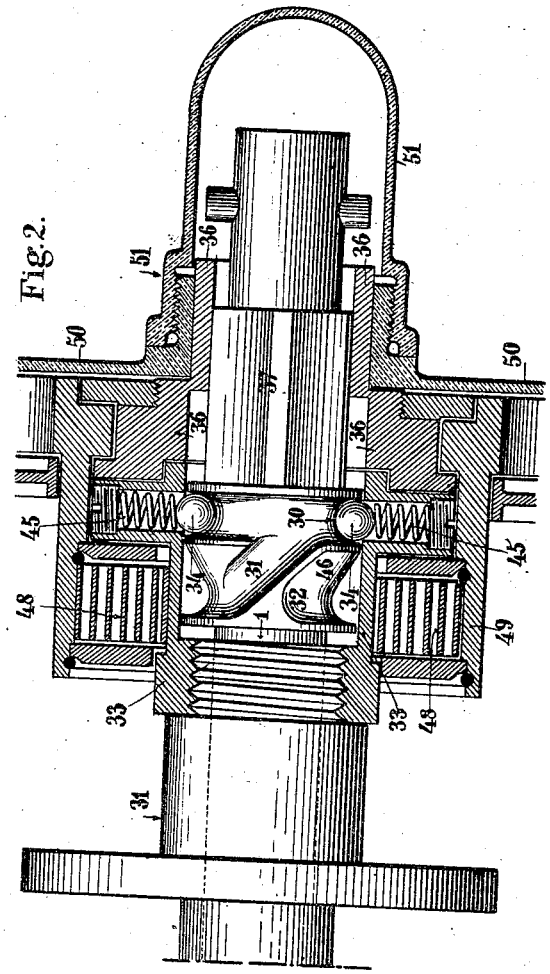

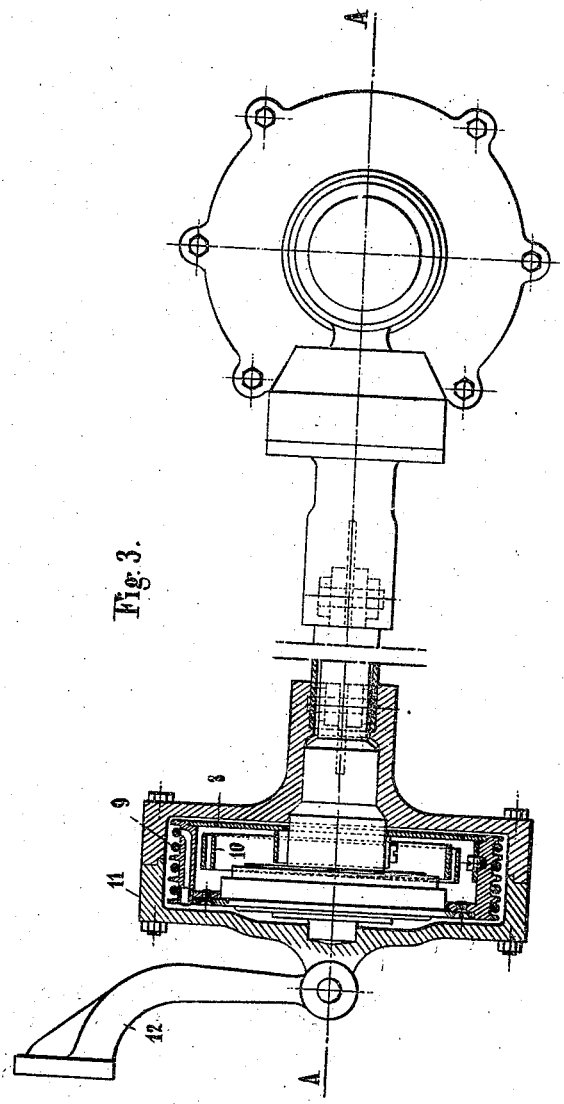

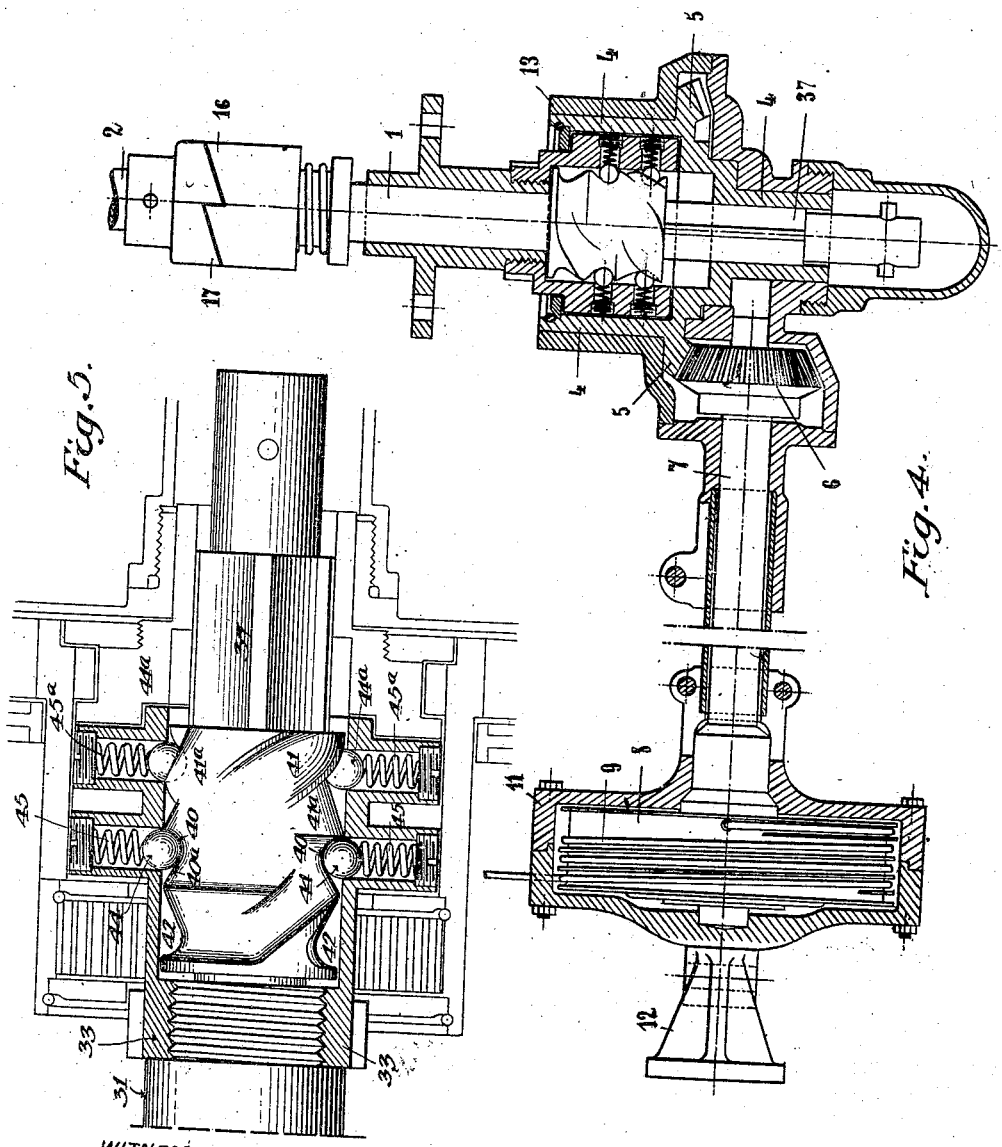

UNITED STATES PATENT OFFICE.

EDMOND FILLETTAZ, OF NEUILLY-SUR-SEINE, FRANCE.

STARTING DEVICE FOR MOTOR-VEHICLE ENGINES.

1,178,788.

Specification of Letters Patent. Patented Apr. 11, 1916.

Application filed December 28, 1914. Serial No. 879,368.

*To all whom it may concern:*

Be it known that I, EDMOND FILLETTAZ, a citizen of the Republic of Switzerland, and resident of Neuilly-sur-Seine, France, (post-office address 42 Boulevard du Parc,) have invented a new and useful Starting Device for Motor-Vehicle Engines, which starting device is fully set forth in the following specification.

This invention relates to starters for motor cars, and it comprehends, briefly, the provision of an improved mechanism of the character specified, which is so constructed as to enable the engine, or motor, to be started from the driver's seat by the mere manipulation of an operating handle.

An embodiment of the invention is illustrated in the accompanying drawing, whereof:—

Figure 1 is a longitudinal sectional view, with parts in elevation, showing the relative arrangement of the engine and starting shafts, and the operating parts associated with the latter. Fig. 2 is a view similar in the main to Fig. 1, but showing the starting shaft and associated parts in a different position. Figs. 3 and 4 are, respectively, a part-sectional front elevation, and a horizontal, longitudinal section, the latter on line A—A, Fig. 3, showing a modification of the device for actuating the starting shaft. Fig. 5 is a view somewhat similar to Fig. 1, but showing a further modification.

Referring more particularly to said drawing, 2 indicates the driving or engine shaft, and 1 a starting shaft which is arranged in front of, and directly in line with the engine shaft, the starting shaft being utilized to directly and positively rotate the engine shaft, so as to start the engine, and being itself positively operated by the driver from his seat, through the intermediary of suitable means or mechanism, all as hereinafter described. The aforesaid starting shaft is mounted for both rotary and longitudinal movement in a bearing sleeve or socket 31, secured in any desired manner to the front portion of the chassis, and is provided at its rear end with a sliding clutch member 16, controlled by a spring 37ª and adapted to co-act with a clutch member 17 fixed to the front end of the engine shaft. The starting shaft is normally held in ineffective, forward position, so as to separate the two clutch members, and is provided adjacent its front end with a polygonal enlargement or collar 37, that has a sliding fit in the similarly-shaped forward portion of a sleeve 36, the latter, in the construction shown in Figs. 1 and 2, having its rear portion embraced by a driving pulley 35. This pulley is designed to be rotated in one direction, from the driver's seat, by a cable 35ª, and, when so rotated, to transmit its motion to sleeve 36 through the agency of a ball-clutch, the balls 38 of the clutch co-acting with notches formed in the inner peripheral surface of the pulley hub 49. The rotation of said hub serves, in turn, to rotate the starting shaft, as will be apparent. When the pull upon said cable is released, the pulley is automatically returned to initial position by the unwinding of an internal spring 48, which is coiled in the space or chamber provided between the pulley hub and a stationary sleeve 33 threaded upon the front end of the sleeve 31, said spring having previously been wound up during the rotation of the pulley incidental to the actuation of the cable. The pulley is preferably inclosed in a casing 50, to which is detachably secured a cap 51 that fits over the front end of the starting shaft and may be removed in order to permit said shaft to be manually cranked if the occasion therefor arises.

In place of the cable and pulley device just described, there may be employed, if preferred, the modified arrangement illustrated in Figs. 3 and 4, wherein the polygonal portion of the starting shaft is fitted in a sleeve 4, which is formed with a circumferential gear ring 5. Said ring 5 meshes with a bevel gear 6, fast on the inner end of a counter-shaft 7, that is disposed at right-angles to the starting shaft, at the front of the chassis, and carries at its outer end a drum 8, the latter being connected by a ball-clutch, (not shown), with said shaft 7, in the same way that the pulley 35 is connected with the starting shaft, and likewise containing an internal coiled returning spring 10. Also, said drum is rotated by a cable 9, which leads to the driver's seat, and is inclosed in a casing 11 attached to a bracket or lug 12 on the chassis, said cable being normally wound up on said drum by the action of the aforesaid returning spring 10. It will, therefore, be understood that when a pull is exerted either upon the cable 35ª, or upon the cable 9, the associated pulley 35, or drum 8, will be rotated and, through the medium of its ball-clutch, will, in turn, rotate the starting shaft. The latter, however, is normally held at the limit of its forward movement, as previously stated, so that it becomes necessary, if this movement of the starting shaft is to be utilized to rotate the engine shaft, to provide some means or mechanism whereby said starting shaft, during its rotation, is forced rearwardly, to engage the clutch members 16 and 17. This action may be produced by means of the shifting device illustrated in Figs. 1 and 2, in place of which, however, the modification represented in Figs. 4 and 5 may be employed, if desired.

According to the first construction, there is provided upon the starting shaft, directly to the rear of the polygonal portion 37, a boss or collar that is formed with a circumferential groove 30, which latter is intersected by the forward ends of two right-handed helical ribs or blades 31, whose rear ends similarly intersect two short grooves 32, disposed parallel with groove 30; and between these grooves 30 and 32 are arranged conical or inclined portions 46 that slope toward groove 30. The above-mentioned sleeve 33 is formed with a pair of pockets for the reception of balls 34, which are pressed outwardly of said pockets toward the grooved boss by springs 45. When the various parts are in normal position, as depicted in Fig. 1, the balls project into the short groove 32, adjacent to the points where the helical blades 31 meet the same, so that as soon as the rotation of the starting shaft commences, said balls will be guided along said blades into the circumferential groove 30. This is due to the fact that the balls are held against lateral movement by the walls of their pockets, the result being that the starting shaft is caused to move rearward while being rotated, so that the clutch members 16 and 17 are engaged and the engine shaft, in consequence, rotated, the rotation of the latter shaft starting the engine, as will be understood.

As soon as the engine commences to run, the sliding clutch member 16 is pushed forward by the clutch member 17 on the engine shaft and, through the spring 37ª forces the starting shaft slightly in the same direction. This movement of the starting shaft causes the balls 34 to be forced outward of the groove 30, by the edge of the latter, the said balls then resting upon the conical portions 46, the inclination of which is sufficient for the lateral thrust exerted upon said portions by the balls to bring the shaft completely back to its normal position. On the other hand, should the engine start to back-fire, the separation of the clutch members is rendered impossible, but the backward rotation imparted to the starting shaft enables the balls to engage the helical blades 31 and force said shaft forward, the action being the exact reverse of that which takes place under normal conditions.

The modified construction represented in Figs. 4 and 5 is designed for the purpose of effecting a quicker and more positive disengagement of the clutch members, in case of back-firing. According to this construction, the boss wherein are formed the grooves 40 and 42, which correspond, respectively, to the grooves 30 and 32 of the arrangement first described, is provided with helical blades 41, which extend from grooves 42 to groove 40 and are prolonged beyond the latter to the end of the boss. The rear portions of these grooves co-act with balls 44, seated in pockets in sleeve 33 and controlled by springs 45, while their forward or prolonged portions are designed to co-act with a second set of balls 44ª, which are also seated in pockets in said sleeve and are similarly controlled by springs 45ª. The first set of balls is limited in its action to effecting the connection of the starting shaft to the engine shaft; and the second set is limited to effecting the disconnection of said starting shaft from said engine shaft when back-firing occurs. In addition to the blades 41, auxiliary helical blades 41ª may be provided, these auxiliary blades being located between the blades 41 and extending from the front end of the boss to the circumferential groove 40. There may be two or more balls in each set.

In the position which the parts assume when the two shafts are coupled together, which is that represented in Fig. 5, the balls 44 are disposed in the groove 40, while the balls 44ª are engaged with the blades 41 or 41ª; whereas, when the shafts are disconnected, the balls 44 lie in the grooves 42, and the balls 44ª lie in the groove 40. The change from connected to disconnected position, during back-firing, is produced by the action of the balls 44ª on the blades 41 or 41ª, the number of the blades and the balls insuring the immediate disconnection of the starting shaft when the engine commences to reverse. Since the balls 44 do not come into play during this disconnection of the starting shaft the groove 40 is provided at 40ª with a conical or inclined shoulder which is designed to facilitate the sliding movement of the shaft beneath said balls. When the starting shaft makes its return movement from disconnected to connected position, which is effected merely by rotating said shaft in normal direction, the balls 44 are caused to operate, and coact with the blades 41 to produce the necessary rearward movement of the shaft. During the time that said shaft is in connected position, and is rotating, the balls 44ª ride idly over the blades, owing to their yielding mounting in their pockets.

The free end of the operating cable employed may have connected to it a suitable handle or like device, (not shown), which may be mounted on either the dash-board or the floor of the car, so as to be within easy reach of the driver. In the former instance, the cable end is pulled straight back, horizontally; and in the second instance, it is pulled upwardly. In either case, two pulls should be sufficient to start the engine, the first pull effecting the connection of the starting shaft to the engine shaft, while the second pull causes the engine shaft to operate.

I claim as my invention:—

1. A starter for explosive engines, consisting of a starting shaft arranged in line with the engine shaft, said shafts being provided with co-acting clutch members for temporarily coupling them together; means for shifting said starting shaft endwise toward said engine shaft, to engage said clutch members, said shifting means comprising a body on said starting shaft formed with a circumferential groove, a plurality of grooves of limited length disposed parallel with the first-named groove, helical blades connecting said first-named groove with the second-named grooves, and conical portions arranged between said first- and second-named grooves and sloping toward the latter; a set of relatively-stationary balls located in juxtaposition to said body and yieldingly pressed toward the same for co-action with said first- and second-named grooves, said blades and said conical portions; and means for rotating said starting shaft about its longitudinal axis from a distance.

2. A starter for explosive engines, consisting of a starting shaft arranged in line with the engine shaft, said shafts being provided with co-acting clutch members, one of which is yieldingly mounted, for temporarily coupling them together; means for shifting said starting shaft endwise toward said engine shaft, to engage said clutch members, said shifting means comprising a body formed with a circumferential groove, helical blades disposed at opposite sides of said groove, and a plurality of grooves disposed at one side only of the first-named groove; two sets of relatively-stationary balls located in juxtaposition to said body and yieldingly pressed toward the same for co-action with said first- and second-named grooves and with said blades; and means for rotating said starting shaft about its longitudinal axis from a distance.

In testimony whereof I have signed this specification in the presence of two subscribing witnesses.

EDMOND FILLETTAZ.

Witnesses:
EMILE LEDRET,
DE WITT C. POOLE, Jr.